United States Patent [19]

Wisniewski

[11] Patent Number: 5,501,384
[45] Date of Patent: Mar. 26, 1996

[54] STORAGE SYSTEM

[75] Inventor: Chester R. Wisniewski, Grand Haven, Mich.

[73] Assignee: Prince Corporation, Holland, Mich.

[21] Appl. No.: 273,236

[22] Filed: Jul. 11, 1994

[51] Int. Cl.⁶ .................................................. B60R 11/00
[52] U.S. Cl. .......................... 224/539; 220/531; 220/772; 220/254
[58] Field of Search ................................ 224/42.42, 319, 224/539; 220/254, 523, 525, 526, 532, 533, 503, 521, 335, 230, 212.5, 526, 530, 531, 551, 772

[56] References Cited

U.S. PATENT DOCUMENTS

| 110,991 | 1/1871 | Miller | 220/531 |
|---|---|---|---|
| 1,157,045 | 10/1915 | Risher | 220/531 |
| 1,570,263 | 1/1926 | Kurowski | 220/335 |
| 2,175,949 | 10/1939 | Allen . | |
| 2,221,024 | 11/1940 | Hood | 220/533 |
| 2,284,798 | 6/1942 | Boose | 220/212.5 |
| 2,346,636 | 4/1944 | Porter | 220/254 |
| 2,433,870 | 1/1948 | Socke | 220/212.5 |
| 2,672,232 | 3/1954 | Kessell, Jr. | 220/521 |
| 2,784,027 | 3/1957 | Temp . | |
| 2,867,471 | 1/1959 | Coon, Jr. . | |
| 3,132,781 | 5/1964 | Poczatek . | |
| 3,468,576 | 9/1969 | Beyer et al. | 220/230 |
| 3,565,305 | 2/1971 | Belokin, Jr. | 224/319 |
| 3,640,423 | 2/1972 | Parker et al. | 220/335 |
| 4,064,528 | 10/1977 | Wagoner . | |
| 4,418,823 | 12/1983 | Romick | 220/525 |
| 4,540,213 | 9/1985 | Herlitz et al. . | |
| 4,718,584 | 1/1988 | Schoeny . | |
| 5,007,569 | 4/1991 | Zarb | 220/532 |
| 5,025,964 | 6/1991 | Phirippidis . | |
| 5,054,668 | 10/1991 | Ricchiuti . | |
| 5,094,375 | 3/1992 | Wright . | |
| 5,129,612 | 7/1992 | Beaupre . | |
| 5,161,700 | 11/1992 | Stannis et al. . | |
| 5,193,706 | 3/1993 | Hanna et al. | 220/772 |
| 5,337,911 | 8/1994 | Holub | 220/254 |
| 5,347,746 | 9/1994 | Letson | 220/772 |

FOREIGN PATENT DOCUMENTS

| 1578182 | 8/1969 | France | 220/533 |
|---|---|---|---|
| 676777 | 3/1939 | Germany | 220/533 |
| 738375 | 10/1955 | United Kingdom | 220/335 |

Primary Examiner—Henry J. Recla
Assistant Examiner—Gregory M. Vidovich
Attorney, Agent, or Firm—Price, Heneveld, Cooper, DeWitt & Litton

[57] ABSTRACT

A storage system for a vehicle includes a molded bin configured to fit within a trunk or rear storage area of the vehicle. A bin cover is pivotally secured to the bin to cover the bin for safe storage of articles in the bin. The bin cover includes an opening, and a second cover is pivotally secured to the primary cover over the opening so that the bin can be selectively accessed by opening either the bin cover or the secondary cover. Dividers are pivotally secured to the bottom of the bin and also to the bin cover so that they can be selectively raised to subdivide the space over the bin bottom and the bin cover for laterally supporting articles placed on the bin bottom and the bin cover, respectively. A modified storage system having a molded bin and adjacent covers is also disclosed.

20 Claims, 5 Drawing Sheets

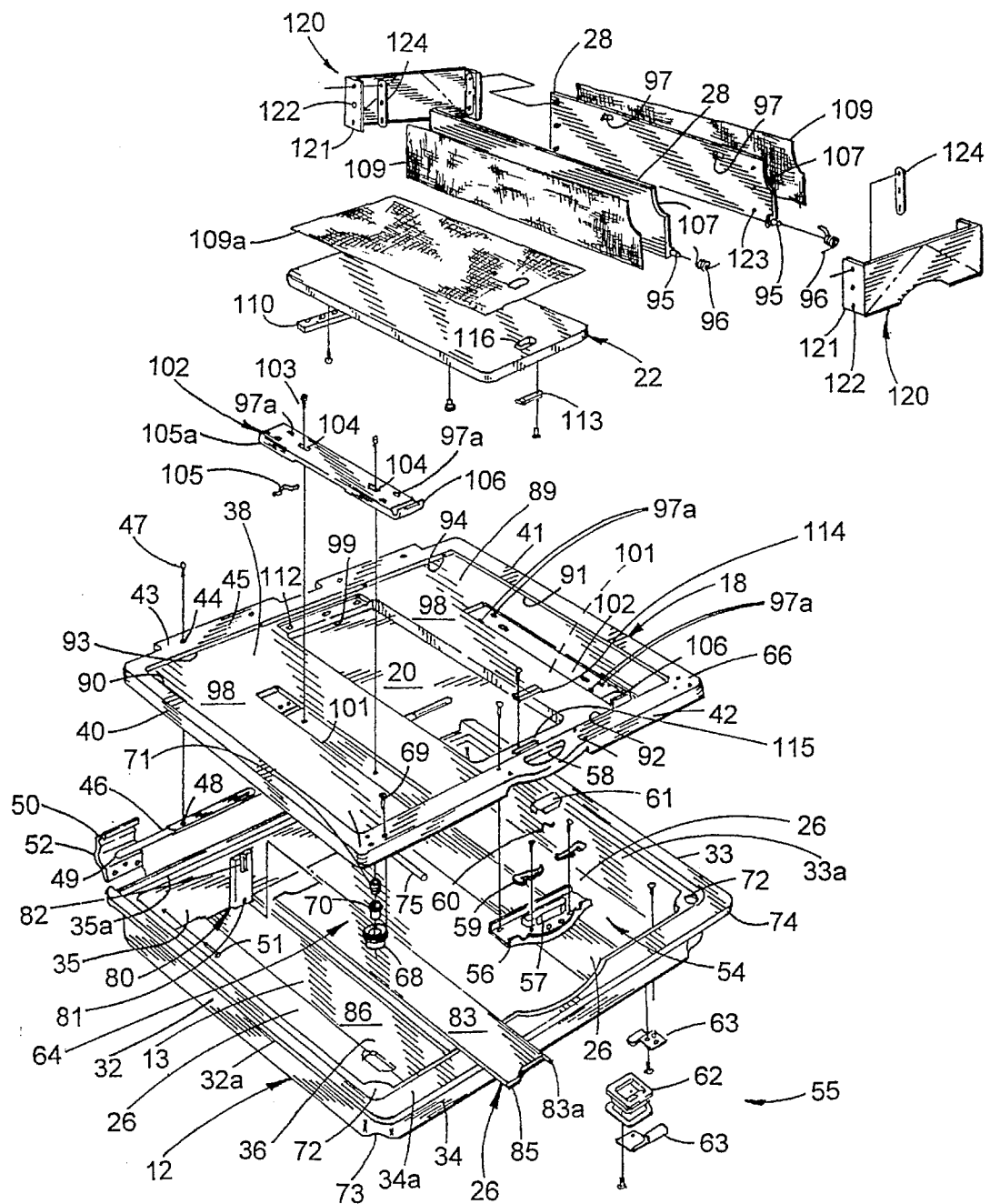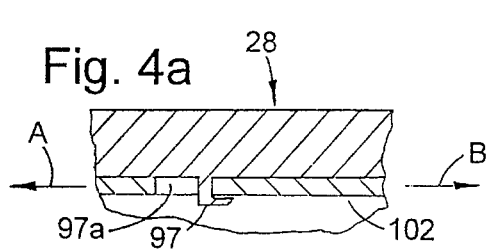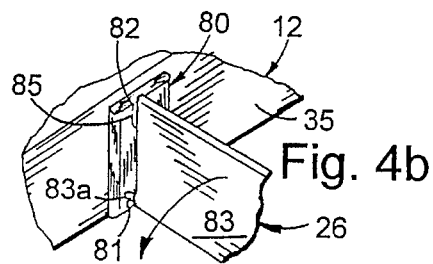

STORAGE SYSTEM

BACKGROUND OF THE INVENTION

The present invention concerns a vehicle storage system, and more particularly concerns an apparatus for use in a vehicle for subdividing a storage area in the vehicle.

Modern vehicles are frequently used to transport items such as bags of groceries, boxes, presents and other articles. It is often desirable to provide lateral support to the items being transported so that they do not tip over and spill or otherwise slide around during transport. However, it is not always possible to predict the size of the items to be supported ahead of time. Further, it is not convenient to retrieve or keep handy special dividers to subdivide a storage area. Still further, many vehicle trunks or vehicle storage areas are inconveniently deep, and it is not easy or safe to lift items from the bottom of the storage area.

Thus, a storage system solving the aforementioned problems is desired.

SUMMARY OF THE INVENTION

The present invention includes an apparatus for subdividing a storage area in a vehicle. The apparatus includes a storage bin defining a compartment and a first cover configured to cover the storage bin, the first cover being movable between open and closed positions. The first cover defines a secondary access opening and a second cover is attached to the first cover for covering the access opening so that the compartment can be accessed by selectively opening one of the first or second covers as desired. In a preferred form, dividers are pivotally secured to the storage bin and the first cover for subdividing the spaces over the storage bin and the first cover for laterally supporting articles placed thereon.

These and other objects, advantages and features of the present invention will be further understood by a person of ordinary skill in the art upon a thorough review of the specification, claims and appended drawings.

BRIEF DESCRIPTION OF THE DRAWINGS

FIG. 4 is an exploded perspective view of the storage system shown in FIG. 1;

FIG. 4a is an enlarged fragmentary view of a divider and a divider latch shown in FIG. 4;

FIG. 4b is a perspective fragmentary view of the bin and one of the dividers shown in FIG. 4;

DETAILED DESCRIPTION OF THE PREFERRED EMBODIMENT

Figure 2:
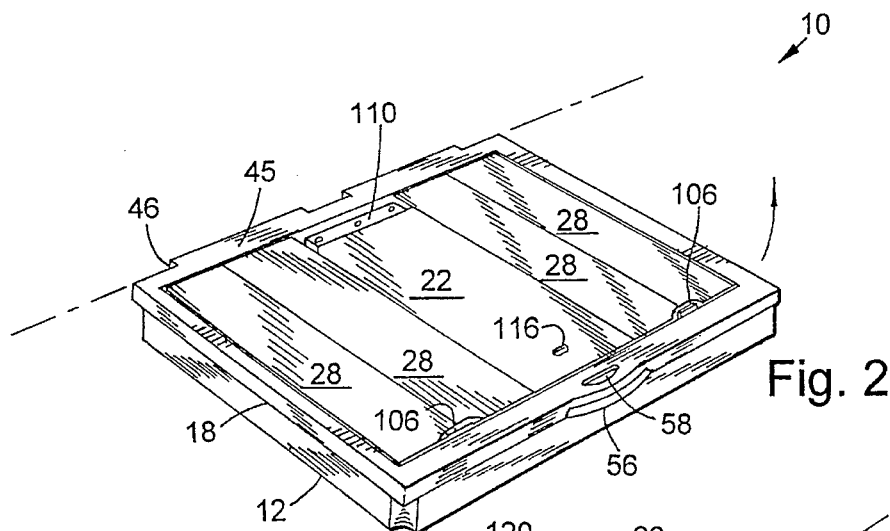
FIG. 2 is a perspective view of the storage system shown in FIG. 1, the dividers and the secondary cover being shown in the closed position.
Figure 3:
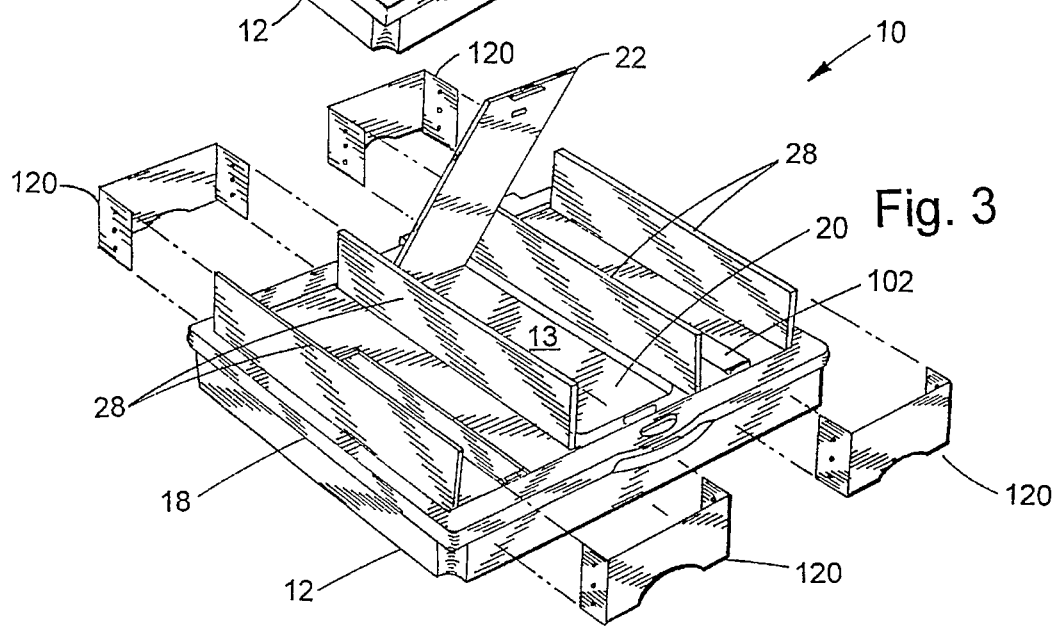
FIG. 3 is a perspective view of the storage system shown in FIG. 2, the dividers and secondary cover being shown in the raised and open positions, respectively.
Figure 1:
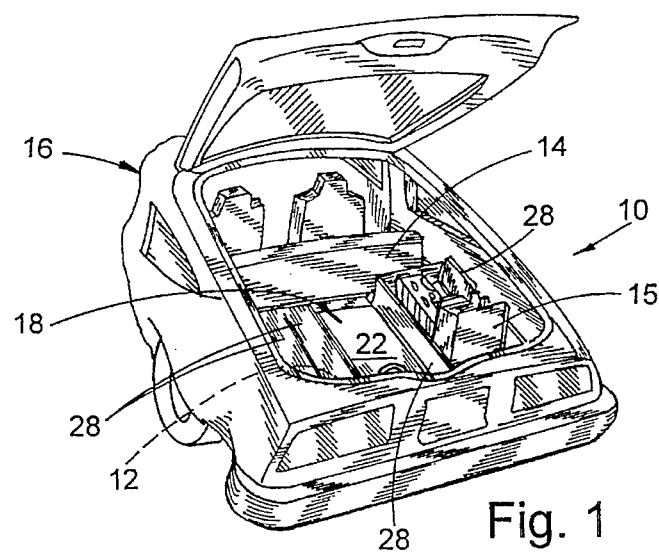
FIG. 1 is a perspective view of a storage system embodying the present invention, the storage system being positioned in the rear storage area of a vehicle.

A storage system or apparatus 10 (FIGS. 1–3) embodying the present invention includes a molded bin 12 configured to fit within a trunk or rear storage area 14 of a vehicle 16. A bin cover 18 is pivotally secured to the bin 12 to cover the bin for safe storage of articles is in the bin. The bin cover 18 includes an access opening 20, and a secondary cover 22 is pivotally secured to the bin cover 18 over the access opening 20 so that the compartment 13 within molded bin 12 can be accessed by opening either the bin cover 18 or the secondary cover 22. Dividers 26 (FIG. 4) are pivotally secured to the bottom of storage bin 12 and also partition panels 28 are pivotally secured to the top of bin cover 18, so that the dividers can be selectively raised to subdivide the storage spaces in the bin or on the bin cover for laterally supporting articles 15 placed thereon. Thus, storage system 10 divides the storage area 14 into upper and lower divided compartments, and also provides convenient access to the storage areas, even if packages 15 are located on the cover 18. Also, the dividers 26 and 28 provide a convenient mechanism for selectively subdividing the storage areas in the storage bin 12 and on the bin cover 18.

Storage bin 12 (FIG. 4) is a generally cup-shaped, molded structure. Bin 12 includes sidewalls 32 and 33, a front wall 34, a rear wall 35, and a bottom 36 defining compartment 13. Flanges 32a–35a are located along the upper edges of walls 32–35, respectively.

Bin cover 18 includes a main panel or body 38 bounded by shaped edges 40–43 configured to mateably engage flanges 32a–35a, respectively. Rear edge 43 includes holes 44 and a hinge-rod-engaging surface 45. A hinge rod 46 is nested against surface 45 and secured to bin cover 18 by screws 47 that extend through holes 44 in rear edge 43 and that securely engage holes 48 in rod 46. Hinge rod 46 includes protruding ends 49. A pair of hinge support brackets 50 are secured to opposite ends of rear wall 35 by screws 51. Each bracket 50 includes a rod supporting section 52 that engages and pivotally supports one of rod ends 49. Thus, bin cover 18 is pivotally supported on bin 12 for movement between a closed position and an open position.

A latch 54 is attached to the front edge 42 for releasably engaging a catch 55 attached to front wall 34 on bin 12. A latch housing 56 is attached to the bottom of cover front edge 42. An aperture 57 in housing 56 aligns with a second aperture 58 in front edge 42 to define a finger receiving hole. Latch 54 is mounted in housing 56. Latch 54 includes a pair of movable latching fingers 59, a biasing spring 60 for biasing latching fingers 59 to a latched position, and a handle 61 for moving latching fingers 59 to a released position. Catch 55 includes a lip defining member 62 releasably engageable by latching fingers 59 and a pair of brackets 63 for retaining lip defining member 62 to bin from wall 34.

A pop-up, spring-actuated release 64 is secured to cover 18 at the corners 65 and 66 joining side sections 40 and 41 and front edge 43. Spring release 54 includes a hollow cap 68 including holes for receiving screws 69 for attachment to corners 65 and 66 and a plunger 70 and biasing spring 71 for biasing plunger 70 so that it protrudes from cap 68. The end of plunger 70 engages a landing 72 on corners 73 (and 74) of bin 12 when cover 18 is in the closed position and compressing bias spring 71. When latch 54 is released, bias spring 71 extends plunger 70 and causes cover 18 to "pop up" a short distance to a partially open position for easy grabbing to facilitate opening cover 18. A reinforcing rod 75 extends along one or more cover edges 40–43 to prevent undesirable warping of cover 18, such as from the pressure derived from plunger 70 and bias spring 71.

Several pairs of opposing panel supporting structures 80 are formed in from and rear walls 34 and 35, one pair being for each partition panel 26 although only one is disclosed for purposes of simplifying the description thereof. Each panel supporting structure 80 includes a pivot forming hole 81 located approximate bottom 36 and a slot 82 spaced from hole 81. Each divider 26 includes a planar body 83 and studs 83a extending from the ends defining a pivot 84 for rotatably engaging one of the holes 81. The ends of divider 26 also define a tab 85 for frictionally engaging slot 82. By flexing panel body 83, divider 26 can be popped into a position between opposing structure 80. Each divider 26 is selectively pivotable independently between a raised/upright position wherein tab 85 engages slot 82 and holds panel 26 upright (FIG. 4b), and a lowered/storage position wherein panel 26 lies potentially flat against bin bottom 36 (FIG. 4). Bottom 36 includes depression 86 for receiving panel 26 so that a generally flat surface is provided across the bottom of bin 12 when panels 26 are folded to the storage position. In the illustrated system in FIGS. 2–3, four panels 26 are shown, although varying numbers can be used.

The body 38 of bin cover 18 (FIG. 4) includes an upper surface 89 and shaped edges 40–43 include inner marginal surfaces 90–93, respectively, that define a depression for mateably receiving dividers 28. Pivot defining holes 94 are formed in inner marginal surfaces 92 and 93. Pivots 95 are located in the ends of dividers 28 for engaging holes 94. A spring 96 is located on each of pivots 95 and includes legs that engage the cover 18 and panel 28 to bias the panel 28 to an upright position. Hooks 97 are located on the cover-engaging side of each panel 28.

Upper surface 89 of bin cover 18 is divided into symmetrical side sections 98 and a midsection 99. Midsection 99 defines the secondary access opening 20 through cover 18, and allows access to compartment 13 even if articles 15 are located on side sections 98. (See FIG. 1.) Side sections 98 are large enough to each receive a pair of dividers 28 folded flat against upper surface 89. An elongated rectangular channel 101 (FIG. 4) is formed in upper surface 89 and each of side sections 98 along the center of side sections 98. The channel 101 extends from the front of side section 98 toward the rear of side section 98. A divider latch 102 is slideably positioned in each of the channels 101 and retained therein by screws 103 that engage the bottom of channel 101 and which slide within slots 104 in latch 102. A bent wire latch spring 105 is located in channel 101, the ends of the bent wire latch spring 105 engaging holes in the sides of channel 101 and the center section of the latch spring 105 engaging the inside of a flange 105a on latch 102. Latch spring 105 biases divider latch 102 toward the left in FIG. 4 and FIG. 4a in direction "A" into a latched position for engaging divider hooks 97. (See FIG. 4a) But divider latch 102 further includes a handle 106 for grasping by an operator to move latch 102 to the right (i.e. in direction "B" in FIG. 4b) against the bias of spring 105 to a released position. Notably, a comer 107 of panels 28 is notched so that the latch handle 106 is accessible when the panels 28 are in the storage position. The surfaces of dividers 28 can be painted, textured, or otherwise treated, such as by adhering carpet 109 to them. Also, a section of carpet 109a can be adhered to secondary cover 22 if desired. Alternatively, a sheet of foldable carpeting can be located on bin cover 18 including slits cut to define foldable sections corresponding to the dividers 28 and secondary cover 22. Notably, only two dividers 28 are shown in FIG. 4, although the illustrated storage system 10 includes four dividers 28 (See FIGS. 2–3).

A hinge 110 pivotally connects secondary cover 22 to bin cover 18 over opening 100. In particular, hinge 110 is secured in a depression 112 at the rear of opening 100 and is also secured to the rear of secondary cover 22. A magnetically responsive metal plate 113 is attached to the front end of secondary cover 22 and a magnet 114 is positioned to attract plate 113 and is secured in a recess 115 along the front end of opening 100. A finger hold hole 116 is located adjacent the front end of secondary cover 22 so that an operator can grasp an open secondary cover 22. With secondary cover 22 in the closed position and the partition panels 28 in the storage position, the upper surface defined above cover 18 is generally a smooth, flat surface for supporting articles placed thereon.

End panels 120 of stiff material can be positioned between upright panels 28 to form a continuous sidewall around a compartment defined between panels 28. End panels 120 can be secured to the panels 28 by tabs 121 including holes 122 for engaging protruding pegs 123 on the inside of panels 22. In the illustrated panels 120, a reinforcement tab 124 snap locks onto pegs 123 to hold end panel 120 in place. Alternatively, velcro can be used to provide secure attachment, or the end panel 120 can simply be wedged between panels 22.

In operation, storage system 10 (FIG. 1) is installed in a vehicle 16 by simply placing it in the vehicle, or, alternatively, by securing it to the vehicle such as with screws extending through the bottom of bin 12. To laterally support an article 15 on storage system 10, one or more dividers 28 are released by moving latch 102 to the release position, after which the dividers 28 are biased to an upright position by springs 86 (FIG. 4). Once in the upright position (FIG. 1), one or more articles 15 can be placed on the main panel 38 of bin cover 18. Notably, if articles 15 are placed in an offset position on the side of bin cover 18, secondary cover 22 remains unobstructed and can be opened to access the space below bin cover 18, i.e. the compartment 13.

Similarly, lower bin dividers 26 can be pivoted to an upright position and snap-locked into position by frictional engagement of divider tab 85 in slot 82 to subdivide compartment 13 (FIG. 4b). Thus, articles can be separated as desired in compartment 13. Notably, compartment 13 can be accessed by opening bin cover 18, or by opening only secondary cover 22.

Figure 5:
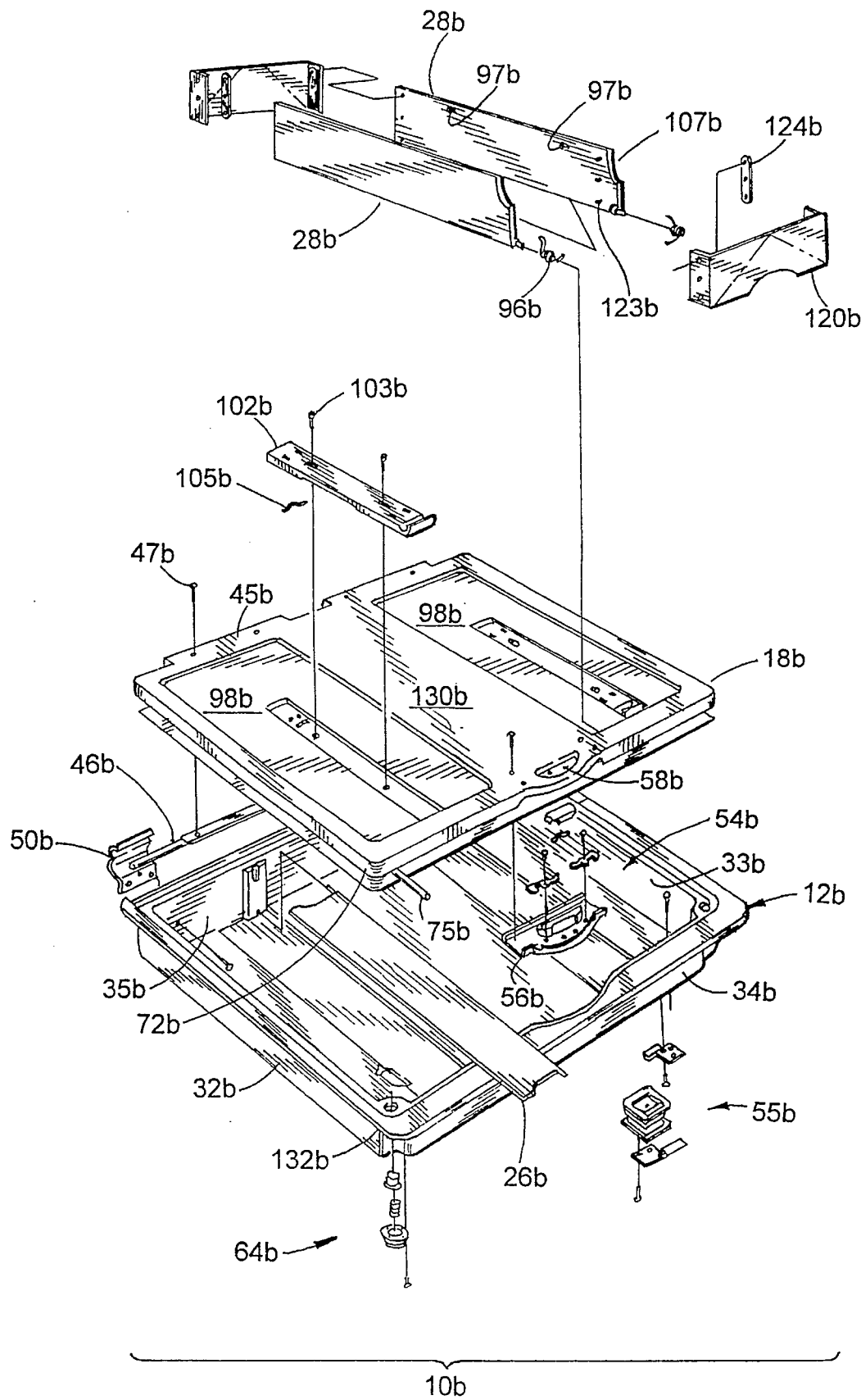
FIG. 5 is an exploded perspective view of a modified storage system embodying the present invention.
Figure 6:
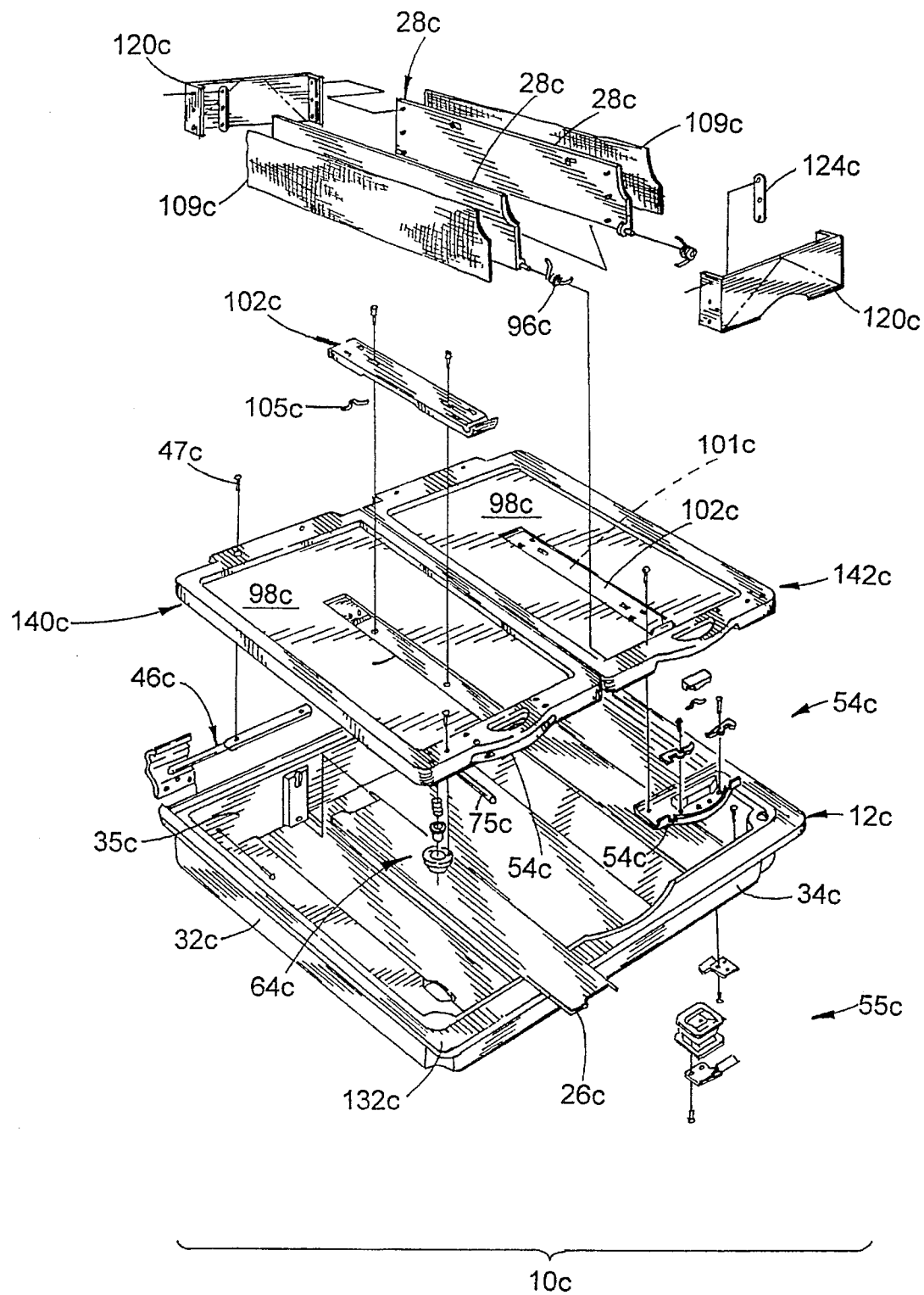
FIG. 6 is an exploded perspective view of another modified storage system embodying the present invention.
Figure 7:
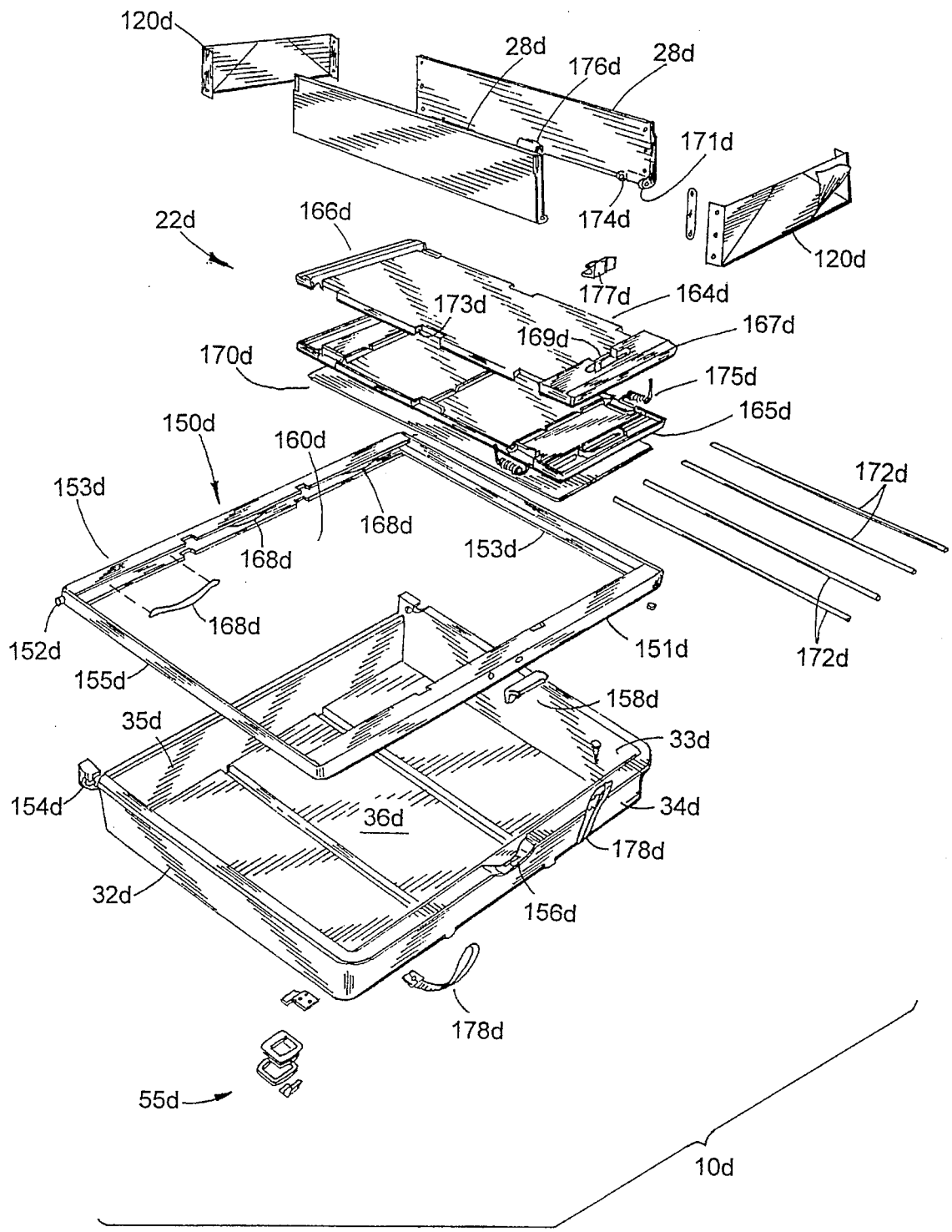
FIG. 7 is an exploded perspective view of yet another modified storage system embodying the present invention.

Modified storage systems 10b, 10c and 10d are shown in FIGS. 5, 6 and 7, respectively. In modified storage systems 10b, 10c and 10d, features and components that are identical to or closely comparable to storage system 10 are identified with identical numbers, but with the addition of the letters "b," "c" and "d," respectively.

Storage system 10b (FIG. 5) is identical to storage system 10 except that an integral flat panel 130b has been incorporated into the center of bin cover 18b and there is no access opening (20) on bin cover 18b. Also, a pop-up spring release 64b is incorporated into the comers 132b of storage bin 12b, and a landing 72b is defined on the corners of cover 18b for engagement by pop-up spring release 64b. Additionally, carpeting is not applied to the top of cover 18b or dividers 28b.

Storage system 10c (FIG. 6) includes a pair of adjacent bin covers 140c and 142c for covering bin 12c. A hinge rod 46c is secured to each of bin covers 140c and 142c and a centrally located hinge rod supporting bracket (50c) is attached midway along rear wall 35c to support the ends of rods 46c located at the center of rear wall 35c. Each bin cover 140c and 142c includes a latch 54c, and a corresponding catch 55c is secured to bin 12c below the respective latch 54c. Also, each bin cover 140c and 142c includes a pop-up spring actuated release 64c. Still further, a pair of dividers 28c are operably mounted in depressions in the top surface of covers 140c and 142c, and a divider latch 102c is slideably positioned in channel 101c for retaining dividers 28c to covers 140c and 142c against the bias of divider opening springs 96c.

In storage system 10d (FIG. 7), a "picture frame" shaped cover frame 150d is formed by C-shaped channels 151d and 153d at the front and rear and by side members 155d. Cover frame 150b is secured to bin 12d by a pair of opposing hinge pins 152d that mateably, releasably engage pivot forming slots 154d in the top of bin sidewalls 32d adjacent rear wall 35d. A latch mechanism 156d is located in bin front wall 34d under the front of cover frame 150d, and a handle 158d is bolted above latch 156d on cover frame front channel 151d for lifting cover frame 150d.

A removable secondary cover 22d is positionable within cover frame 150d for covering the opening 160d defined within cover frame 150d. Only one secondary cover 22d is shown, which one cover covers only a portion of opening 160d; however, it is contemplated that multiple covers 22d can be used or a single and large cover (22d) can be used.

Cover 22d includes opposing panels 164d and 165d that are assembled together to form cover 22d. The ends 166d and 167d of cover 22d define elongated tongues configured to mateably engage channels 151d and 153d of cover frame 150d in a tongue-in-groove relationship. Leaf springs 168d are located in rear channel 151d to bias cover 22d forwardly into engagement with front channel 153d. The front end 167d of cover 22d also includes an aperture 169d forming a finger hold for lifting the cover 22d. A section of carpet 170d is adhered to one side of cover 22d. Cover 22d is reversible so that the carpet 170d and also the dividers 28d attached to cover 22d can be oriented up or down.

Divider panels 28d are pivotally attached to cover 22d on the side opposite carpet 170d. Pivot forming tabs 171d extend from an edge of panels 28d and are engaged by rods 172d which extend through holes 173d in cover 22d and through holes 174d in panel tabs 171d. Springs 175d bias panel 28d to a pivoted upright position, and a latch 176d on panels 28d opposite tab 171d are configured to releasably engage a catch 177d on cover 22d. Catch 177d is operably mounted on cover end 167d. Straps 178d can be used to hold panels 28d and cover 22d closed on bin 12d, and also can be used to carry storage system 20d like a suitcase, if desired.

Thus, there is provided a storage system including a storage bin, a primary cover including a secondary access opening, a secondary cover for the access opening, such that the compartment defined within the storage bin can be accessed either by opening the primary cover or the secondary cover. Also, dividers are provided on one or both of the storage bin or the cover for subdividing the space above and below the cover to laterally support articles placed thereon.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. An apparatus for subdividing a storage area in a vehicle, comprising:

a storage bin defining a compartment and including sidewalls and a bottom;

a first cover configured to cover said storage bin, said first cover being pivotally movable between an open position for accessing said compartment and a closed position, said first cover including marginal material defining an access opening in said first cover; and a second cover configured to cover said access opening, said second cover being pivotally movable between an open position for accessing said compartment through said access opening and a closed position, whereby said compartment can be accessed by selectively opening one of said first and second covers;

a plurality of dividers pivotally connected to a support surface of at least one of said storage bin and said first cover for movement between a raised position wherein said plurality of dividers subdivide the support surface and a lowered position wherein said plurality of dividers form a relatively flat surface for supporting items thereon; and foldable carpet sections positioned on said plurality of dividers and said at least one of said storage bin and said first cover.

2. An apparatus as defined in claim 1 wherein at least a pair of said dividers are pivotally connected to said first cover.

3. An apparatus as defined in claim 1 wherein at least one of said dividers is pivotally connected to said storage bin.

4. An apparatus as defined in claim 1 wherein said marginal material defining said access opening extends around all sides of said access opening.

5. An apparatus as defined in claim 1 including means for holding the plurality of dividers in the raised position.

6. An apparatus for subdividing a storage area in a vehicle, comprising:

a storage bin defining a compartment;

a first cover configured to cover said storage bin, said first cover being pivotally movable between an open position for accessing said compartment and a closed position, said first cover including an access opening in said first cover;

a second cover configured to cover said access opening, said second cover being pivotally movable between an open position for accessing said compartment through said access opening and a closed position, whereby said compartment can be accessed by selectively opening one of said first and second covers;

a plurality of dividers movably connected to said first cover, said dividers being movable between a raised position defining a subdivided space, and a lowered position for storage; and foldable carpet sections positioned on said first cover and said dividers.

7. An apparatus as defined in claim 6 wherein said storage bin includes a molded unitary structure.

8. An apparatus as defined in claim 6 including a latch for holding said first cover securely in said closed position, and further including a pop-up mechanism for moving said first cover to a partially open position upon releasing said latch.

9. An apparatus as defined in claim 6 including a magnetic latch for holding said first cover in said closed position.

10. An apparatus as defined in claim 6 including means for holding the plurality of dividers in the raised position.

11. An apparatus for partitioning a storage area in a vehicle, comprising:

a storage bin defining a compartment including a floor;

a cover configured to cover said storage bin, said cover being pivotally movable between an open position for accessing said compartment and a closed position; and at least one divider pivotally connected to at least one of said storage bin floor and said cover, said at least one divider being movable between a raised position defining a subdivided space on said at least one of said storage bin floor and cover, and a lowered position for storage, said at least one divider when in said lowered position defining a substantially flat surface for supporting items thereon; and foldable carpet sections positioned on said at least one divider and said at least one of said storage bin floor and said cover.

12. An apparatus as defined in claim 11 including a plurality of said dividers each being movable between a raised position and a lowered position.

13. An apparatus as defined in claim 12 wherein each of said plurality of dividers is selectively independently movable between said raised position and said lowered position.

14. An apparatus as defined in claim 12 wherein at least one of said dividers is pivotally connected to said cover.

15. An apparatus as defined in claim 11 including means for holding the at least one divider in the raised position.

16. An apparatus for subdividing a storage area in a vehicle, comprising:

a pair of opposing sidewalls defining a compartment;

a cover pivoted to one of said opposing sidewalls, said cover being pivotally movable between an open position for accessing said compartment and a closed position covering said compartment;

a plurality of dividers pivotally connected to said cover for movement between a raised position wherein said plurality of dividers subdivide an upper surface area of said cover and a lower position wherein said plurality of dividers form a relatively flat surface for supporting items thereon; and foldable carpet sections positioned on said cover and said plurality of dividers.

17. An apparatus as defined in claim 16 wherein said cover is releasably attached to said one opposing sidewall and is removable from said one opposing sidewall.

18. An apparatus as defined in claim 16 including a latch for securely holding said cover in said closed position.

19. An apparatus as defined in claim 18 including a mechanism for moving said cover to a partially open position when said latch is released.

20. An apparatus as defined in claim 16 including means for holding the plurality of dividers in the raised position.

* * * * *

UNITED STATES PATENT AND TRADEMARK OFFICE
CERTIFICATE OF CORRECTION

PATENT NO. : 5,501,384
DATED : March 26, 1996
INVENTOR(S) : Chester R. Wisniewski It is certified that error appears in the above-indentified patent and that said Letters Patent is hereby corrected as shown below:

Column 2, line 54;

"from" should be --front--.

Column 2, line 56;

"comers" should be --corners--.

Column 2, line 59;

"comers" should be --corners--.

Column 3, line 4;

"from" should be --front--.

Column 3, line 57;

"comer" should be --corner--.

Column 4, line 56;

"comers" should be --corners--.

UNITED STATES PATENT AND TRADEMARK OFFICE
CERTIFICATE OF CORRECTION

PATENT NO. : 5,501,384
DATED : March 26, 1996
INVENTOR(S) : Chester R. Wisniewski It is certified that error appears in the above-indentified patent and that said Letters Patent is hereby corrected as shown below:

Column 4, line 57;

"comers" should be --corners--.

Column 4, line 64;

Delete "(50c)"

Signed and Sealed this

Second Day of July, 1996

BRUCE LEHMAN

Attest:

*Attesting Officer*    *Commissioner of Patents and Trademarks*